US006987946B2

(12) United States Patent
Sinclair

(10) Patent No.: US 6,987,946 B2
(45) Date of Patent: Jan. 17, 2006

(54) EVENT LISTENING DEVICE AND SYSTEM

(76) Inventor: Anthony J. Sinclair, 755 N. 165th St., Shoreline, WA (US) 98133

( * ) Notice: Subject to any disclaimer, the term of this patent is extended or adjusted under 35 U.S.C. 154(b) by 50 days.

(21) Appl. No.: 10/285,358

(22) Filed: Oct. 31, 2002

(65) Prior Publication Data

US 2003/0100259 A1 May 29, 2003

Related U.S. Application Data

(60) Provisional application No. 60/335,561, filed on Oct. 31, 2001.

(51) Int. Cl.
*H04Q 7/20* (2006.01)
*H04M 1/00* (2006.01)

(52) U.S. Cl. ............... 455/3.01; 455/456.3; 455/550.1; 455/517; 455/518; 709/313

(58) Field of Classification Search ............... 455/2.01, 455/3.01, 3.02, 3.03, 3.04, 3.05, 3.06, 414.1, 455/414.2, 414.3, 414.4, 553.1, 556.1, 556.2, 455/90.1, 90.6, 90.3, 3.1, 456.3, 550.1, 517, 455/518; 340/7.1, 7.2, 7.21, 7.26, 7.28, 7.45, 340/7.47, 7.48, 7.54, 7.55, 7.56, 7.52, 7.61; 370/540, 362; 375/362; 709/313
See application file for complete search history.

(56) References Cited

U.S. PATENT DOCUMENTS

| | | | | |
|---|---|---|---|---|
| 5,161,250 | A | 11/1992 | Ianna et al. | 455/66 |
| 5,504,476 | A * | 4/1996 | Marrs et al. | 340/7.48 |
| 5,589,892 | A * | 12/1996 | Knee et al. | 725/43 |
| 5,946,635 | A * | 8/1999 | Dominguez | 455/558 |
| 6,434,398 | B1 * | 8/2002 | Inselberg | 455/517 |
| 2002/0138659 | A1 * | 9/2002 | Trabaris et al. | 709/313 |

* cited by examiner

*Primary Examiner*—Nick Corsaro
*Assistant Examiner*—Alan T. Gantt
(74) *Attorney, Agent, or Firm*—Seed IP Law Group PLLC

(57) ABSTRACT

The proposed invention provides a way for sports fans to participate more fully in the game-race or his/her favorite sport. This invention provides the spectator with a single point of audio contact with the sport, bringing the fan into the game or race, preserving the passion and reverence for the game that he/she has for his/her sports choice. The communication system includes networking a plurality of existing recording devices with a centralized transmission system whereby selected information is broadcast to personal receivers. The individuals in possession of a personal receiver can select from a plurality of different broadcast selections, for example, conversations in the bullpen or press box.

13 Claims, 14 Drawing Sheets

EVENT LISTENING DEVICE AND SYSTEM

CROSS-REFERENCE TO RELATED APPLICATION

This application claims the benefit under 35 U.S.C. § 119(e) of U.S. Provisional Patent Application No. 60/335,561 filed 31 Oct. 2001, entitled Sports Listening Device and System, naming Anthony Sinclair as inventor, said provisional application hereby incorporated herein by reference in its entirety.

BACKGROUND OF THE INVENTION

1. Field of the Invention

This invention relates generally to communication technology and, more specifically, to a system and method for receiving and transmitting a wide range of audio information at sporting events.

2. Description of the Related Art

In the related art, there is not a single state-of-the-art appliance or application, or a one-solution capability to provide spectators at any major sporting venue with the opportunity to listen to all game related action. People attending a game can only hear what is broadcast over the loudspeaker system. Thus there is presently no system to allow fans to hear audio transmissions from radio, television, local advertisers or supporters (who have audio commercials available to air), emergency announcements, or all available conversations from the playing field during any given game (college, professional, or any sports gathering).

When at a sporting event, such as either a professional or college sports event, the spectator in the stands is not given the opportunity to be involved, or to participate in the heart of the game (or effects of the game) using all of his/her senses. The spectator in the stands simply waits to hear any announcements or information provided to him/her by the stadium or sports team announcer. Presently, the spectator cannot hear the chatter of the players on the field of play or on the sidelines.

BRIEF SUMMARY OF THE INVENTION

The proposed invention provides a way for sports fans to participate more fully in the game, race or his/her favorite sport. In one embodiment, the invention provides the spectator a single point of audio contact with the sport, bringing the fan into the game or race, preserving the passion and reverence for the game that he/she has for his/her sport of choice. In one embodiment, the communication system includes networking a plurality of existing recording devices with a centralized receiving/transmission system whereby selected information is broadcast to personal receivers. The individuals in possession of a personal receiver can select from a plurality of different broadcast selections, for example, conversations in the bullpen or press box.

As will be readily appreciated from the foregoing summary, the invention provides the avid sports fan access to the field of play and greater involvement in his/her game or race of choice.

BRIEF DESCRIPTION OF THE SEVERAL VIEWS OF THE DRAWINGS

The preferred and alternative embodiments of the present invention are described in detail below with reference to the following drawings.

The use of the same symbols in different drawings typically indicates similar or identical items.

DETAILED DESCRIPTION OF THE INVENTION

Figure 1A:
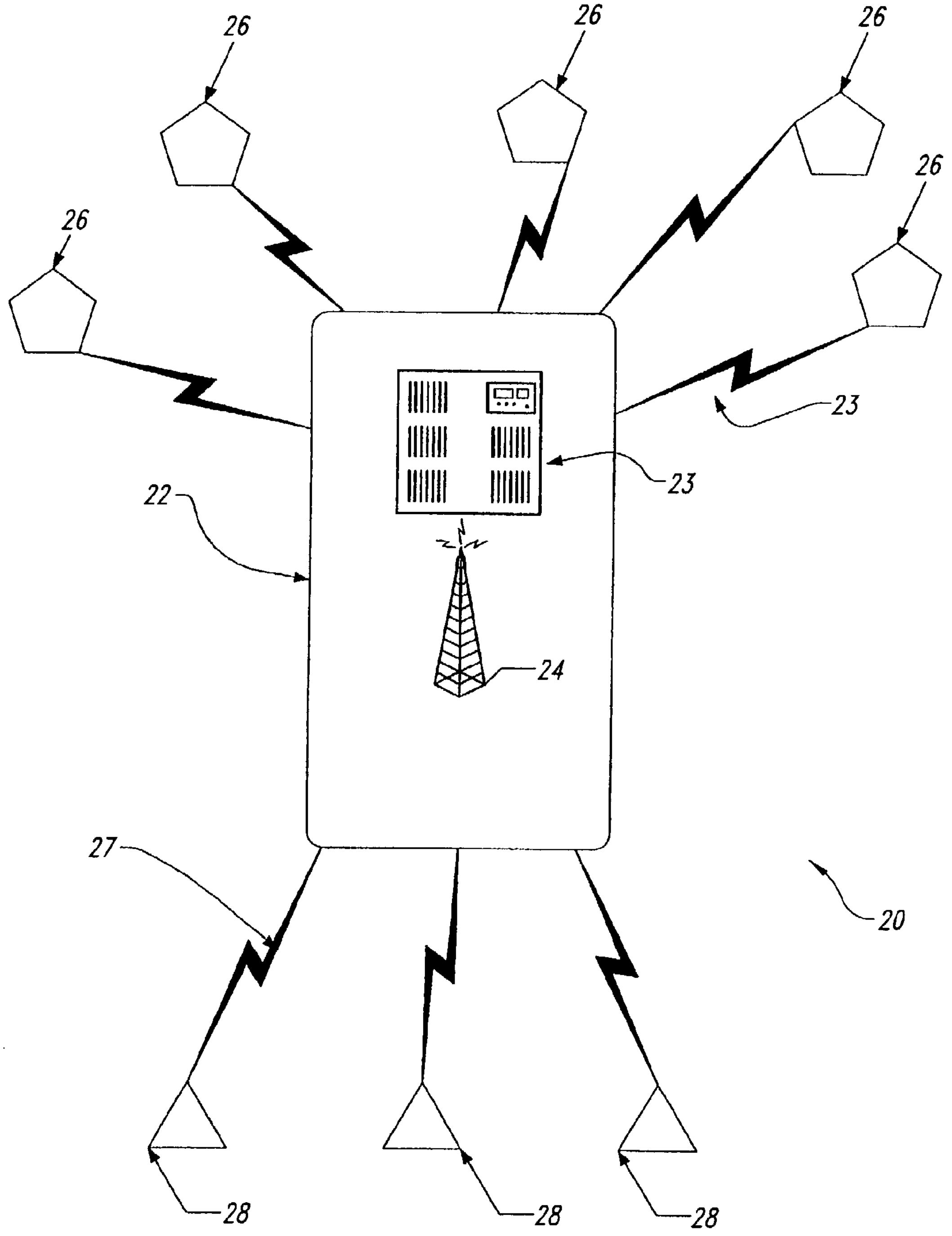
FIG. 1A shows a preferred embodiment of the present invention including a communication system 20 having a system receiver/transmitter 22 configured to receive information from a plurality of remote recording devices 26, encode the information and then broadcast selected audio data to a plurality of personal receivers 28.

The present invention provides a system and method for collecting and selectively distributing audio information to personal receivers. By way of overview and with reference to FIG. 1A, a preferred embodiment of the present invention includes a communication system 20 including a system receiver/transmitter 22 configured to receive information from a plurality of remote recording devices 26, encode the information and then broadcast selected audio data to a plurality of personal receivers 28. The personal receiver 28 decodes the broadcast data 27 and allows an individual user to hear selected broadcast information. The communication system 20 and personal receiver 28 are described with more particularity below.

For purposes of example only, we have chosen to outline specifics of the invention as it relates to baseball. In accordance with other and future aspects of the invention, note that similar configurations of microphones and parabolic dishes (and all related figures) can be applied to other sports noted above, as well as sports popular in other cultures such as rugby, cricket, and the Olympic and Goodwill games.

The receiver/transmitter 22 receives and assembles audio transmissions from a plurality of remote listening/recording devices 26, for example, a microphone, a parabolic dish, wireless transmission (e.g., microwave), audio from a TV/radio broadcast or data from a radio modem, within the stadium or affiliated TV/radio broadcast. The receiver/transmitter 22 processes the transmissions, for example, by encoding the signal into a sine wave that transmits it (under strict FCC-regulated frequency modulation) as radio waves 27 assigned to the personal receivers 28, in essence, the internal microchip (the companion chip to 36 in FIG. 2) of the transmitter scrambles, or locks, the signal.

Figure 2:
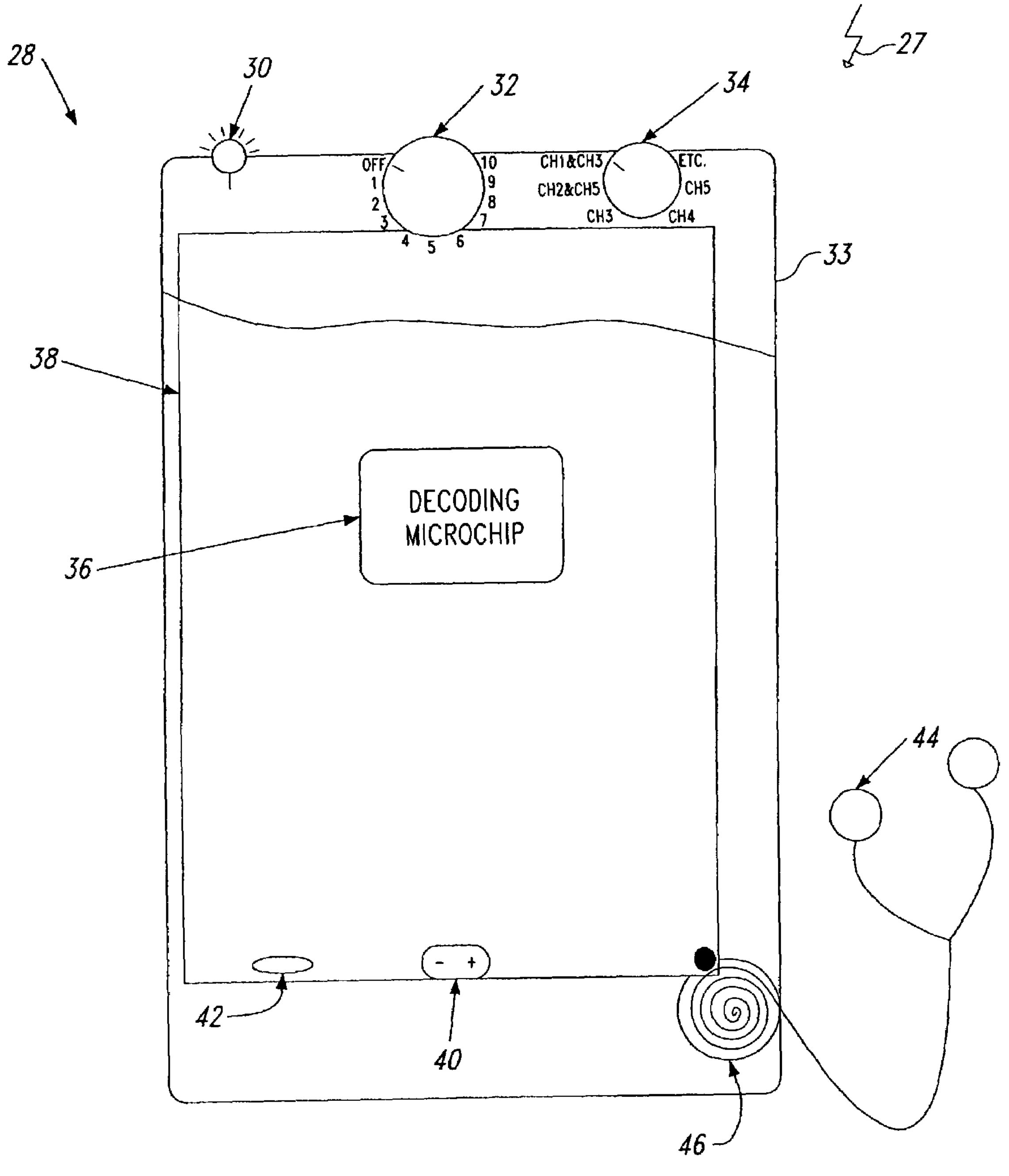
FIGS. 2–6 depict the personal receiver 28 having a specifically designed AM or FM circuit board designed to fit within a housing 33 of the type used for current broadcast transmission and receiving equipment.

The personal receiver 28 receives the radio waves 27 and decodes the message using a "key" algorithmic message from the sine wave it receives, then conveys the sounds to the listener through the speaker system, for example earphones (44 in FIG. 2). The algorithmic message tells the personal receiver what decoding algorithm to use.

In one embodiment, the receiver/transmitter 22 utilizes existing antenna technology to radiate and capture the radio signal 23. However, other communication systems are considered within the scope of this invention, for example, wireless capabilities, flat wire antenna capabilities, or optical communication devices.

FIG. 1A depicts the communication system 20. The remote recording devices 26 receive transmissions from a variety of sources. The remote sources include on-field and on-person microphones located in dugouts, bullpens, pre and post game radio/TV audio interviews, batting cages, under each base bag and on all managers, coaches, umpires, and selected individuals to be determined by teams and sports-related authorities. Other remote recording devices 26 include parabolic dish microphones/receivers in stands in right field, left field, centerfield, and behind home plate, as well as in appropriate television camera positions and other locations within the stadium yet to be determined. Still other sources include radio broadcast microphones in press boxes and other areas of game-related commentary located to transmit comments from existing broadcasts/simulcasts from local radio personality/commentators as well as foreign-language commentators. Still other sources include audio signals from microphones in press boxes located to transmit existing audio broadcasts/simulcasts from television commentators, as well as foreign-language broadcast commentary. In addition, in some embodiments receiver/transmitter 22 intermittently transmits on one or more channels of personal receivers 28 either live or recorded audio advertising from stadium and non-stadium game sponsors, including team-merchandising operations, where such audio advertising is provided by the advertisers. In addition, in some embodiments, receiver/transmitter 22 intermittently transmits, on one or more channels of personal receivers 28, existing emergency audio broadcasts such as storm warnings, in-stand emergencies, national security updates, and post-game traffic reports while fans are still in the stadium or close proximity to the transmission area. In some embodiments, recording devices 26 transmit pre-game locker room discussions between coach/managers and the team, to be determined by the team and/or major league baseball or sports-related authorities, while in other embodiments recording devices 26 transmit pre-game, warm up field conversations including batting practice, and other on-field chatter to be transmitted by microphones or parabolic dishes/receivers noted above or telephone calls to the bullpen (e.g., in some embodiments a wireless phone is actually used as recording device 26).

Figure 1B:
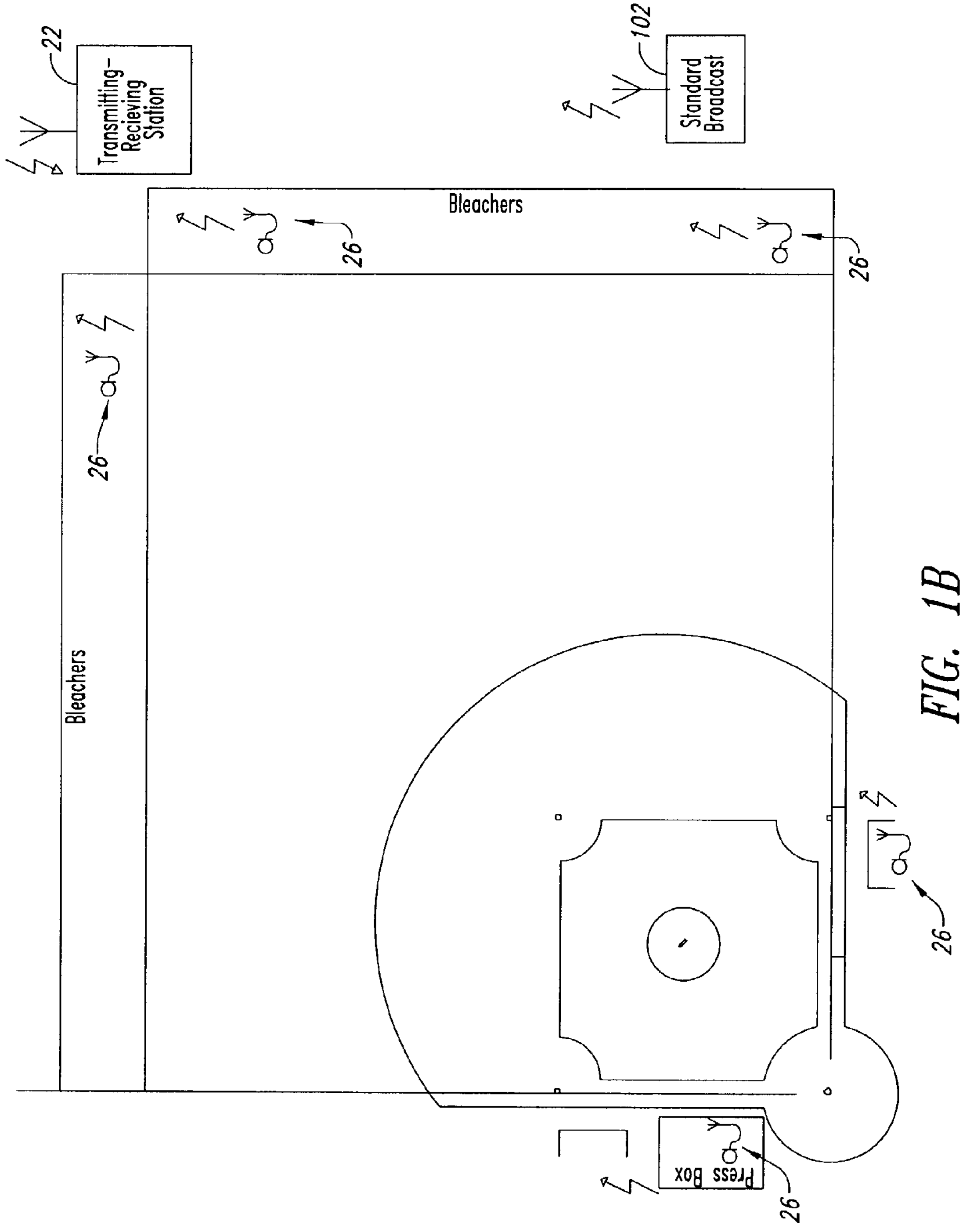
FIGS. 1B and 1C depict a more pictographic representation of one embodiment of the baseball field system and example described in relation to FIG. 1A.
Figure 1C:
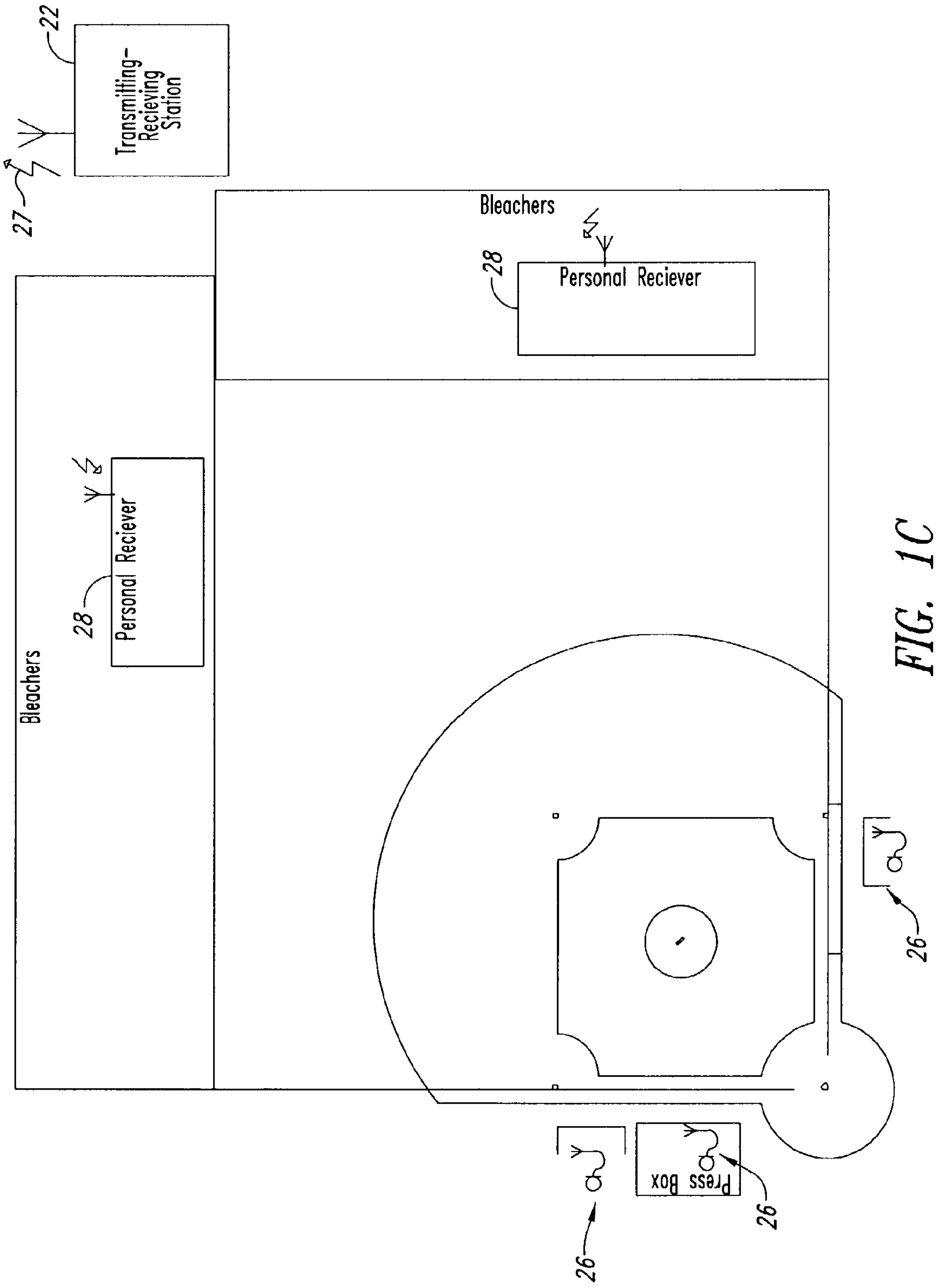

FIGS. 1B and 1C depict a more pictographic representation of one embodiment of the baseball field system and example described in relation to FIG. 1A. FIG. 1B illustrates remote recording devices 26 in the form of audio pickups 26 transmitting signals which are received by receiving-transmitting station 22. The signals can be transmitted by wireless methods, infrared, microwave, hardwire connection or any acceptable technique. Shown are pickups 26 located within the press box, bullpen, dugout, and stands (including box seats and bleachers) of baseball field 100, which are examples of pickups 26 dispersed throughout baseball field 100. Pickups 26 are transmitting wireless signals, which are received by receiving-transmitting station 22. Standard broadcast station 102 is transmitting a wireless signal, which is received by receiving-transmitting station 22. Examples of standard broadcast station 102 are a television broadcast station, a radio broadcast station, an audio simulcast of television broadcast station, a foreign language broadcast station, etc. As shown and described above and below, in one embodiment, pickups 26 transmit their wireless signals using an encoding scheme privately known to pickups 26 and receiving-transmitting station 22.

FIG. 1C shows a pictographic representation of receiving-transmitting station 22 transmitting wireless signals to personal receivers 28. Personal receivers 28 are shown located in the bleachers of baseball field 100 for sake of example, but it is to be understood that receiving-transmitting station 22 typically will broadcast with power sufficient to communicate with personal receivers 28 both within the baseball field 100 and within parking lots (not shown) proximate to baseball field 100. As shown and described above and below, in one embodiment receiving-transmitting station 22 transmits the wireless signals using a decoding scheme privately known to receiving-transmitting station 22 and personal receivers 28.

FIGS. 2–6 depict the personal receiver 28 having a specifically designed AM or FM circuit board designed to fit within a housing 33 of the type used for current broadcast transmission and receiving equipment. The personal receiver 28 is preferably designed to receive an encoded transmission 27 from the system receiver/transmitter 22. More specifically, the personal receiver is designed to decode the signal transmitted by the broadcasting entity through their usual broadcast medium (wireless or satellite transmission systems) under strict FCC-regulated frequency modulation as radio waves assigned to this invention.

A standard design integrated circuit board 38, which can have, among other things, either AM or FM digital or analog circuitry, and constitutes electronics of the personal receiver 28. In one embodiment, the board 38 is configured to mate with a "key" algorithmic receiving microchip 36.

In one embodiment, the earphone wire of earphones 44 will be directly attached to the circuit board 38. However, other speaker configurations are considered within scope of this invention, for example, stereo headsets or ear pieces, or possible wireless technology. Additionally, for embodiments including incorporated earphones 44, a take-up wheel 46 for the earphone wire may be either inside or outside the housing 33, which may be in the form of a molded plastic shell. In one embodiment, the earphones 44 will be of a standard design including soft or hard earpieces. Also included at a location appropriate to the earphones, will be pegs 56 (see FIG. 6) around which the user can wrap the earphone cord for safekeeping, as well as a small clip for securing the earphones. Further iterations may include a take-up wheel.

The personal receiver includes a power and volume control switch 32, a channel selection switch 34, an "on" or low power indicator light 30, and other user control devices.

In one embodiment, the circuit board 38 will house a power source 40. Examples of power sources are batteries or an electrical terminal (not shown). Additionally, in one embodiment, for security purposes, at low-power or upon tampering, circuit board 38 includes circuitry such that a power surge or spike from the batteries may be sent to the reception chip that will destroy the algorithmic key code such as that contained in key algorithmic microchip 36. Also in one embodiment, a low-power signal may signify, via indicator 30, the need to change batteries.

In one embodiment, power switch 32 is connected to the circuit board 38 and is configured to control the volume setting. However, the power and volume may also be under separate control. When in the "on" position, an indicator 30, for example, a green power light, will indicate the unit is an operation. As noted above, the indicator may also indicate low-power.

A channel selector 34 offering a plurality of channels will allow the user to select from a variety of broadcast data 27. For example, an individual may listen to the following:

(a) radio broadcast and on field "chatter";

(b) television broadcasting on field "chatter";

(c) on-field "chatter" only;

(d) radio broadcast only;

(e) television broadcast only;

(f) foreign language broadcasts;

(g) a user selected location, whether from the stands, on the field, or broadcast; and (h) other listening opportunities as previously described in relation to FIG. 1A and as described elsewhere herein.

Although channel selector 34 has been shown as a simple rotary knob for the sake of simplicity, in other embodiments the personal receiver 28 may have an LED display associated with channel selection and/or power, and push buttons for channel selection.

With reference to FIGS. 2–6, the housing 33 is preferably constructed of two pieces of molded plastic to be sealed together. The overall size of the device will be approximately 3-½" tall×2-½" wide×½" thick, or roughly the size of a credit card. It may range in size from that of a small transistor radio to a credit card.

Figure 3:
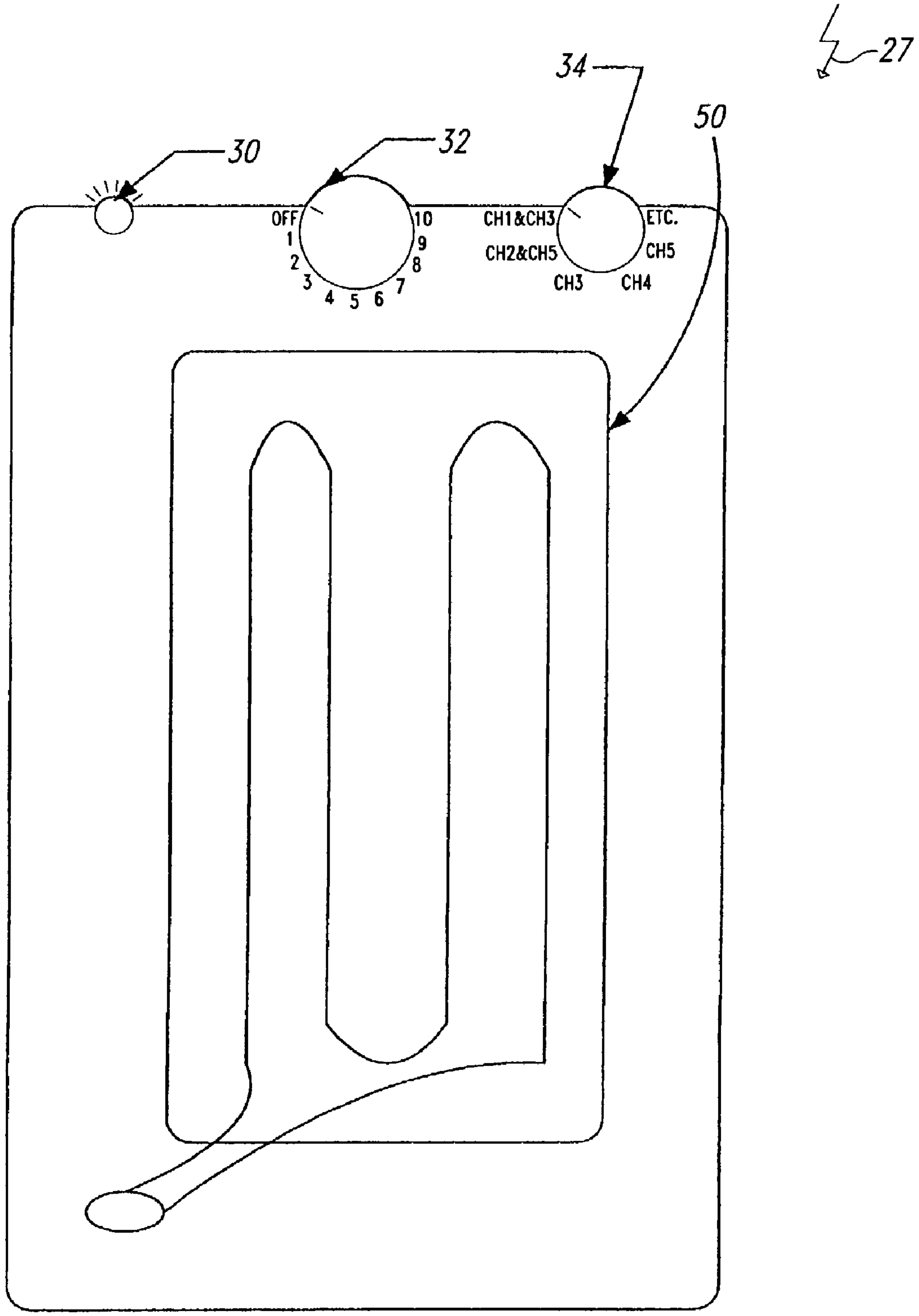

FIG. 3 depicts an antenna 50 of the personal receiver 28. In one embodiment, a front panel of the personal receiver 28 contains a DeCorp Americas Flat Wire Ready Antenna, with the male connector positioned to meet the female receptor 42 noted in FIG. 2. However, other antennas are considered within scope of this invention, for example, short-range fixed antennas, or other new technology flat wire antennas of standard design.

Figure 4:
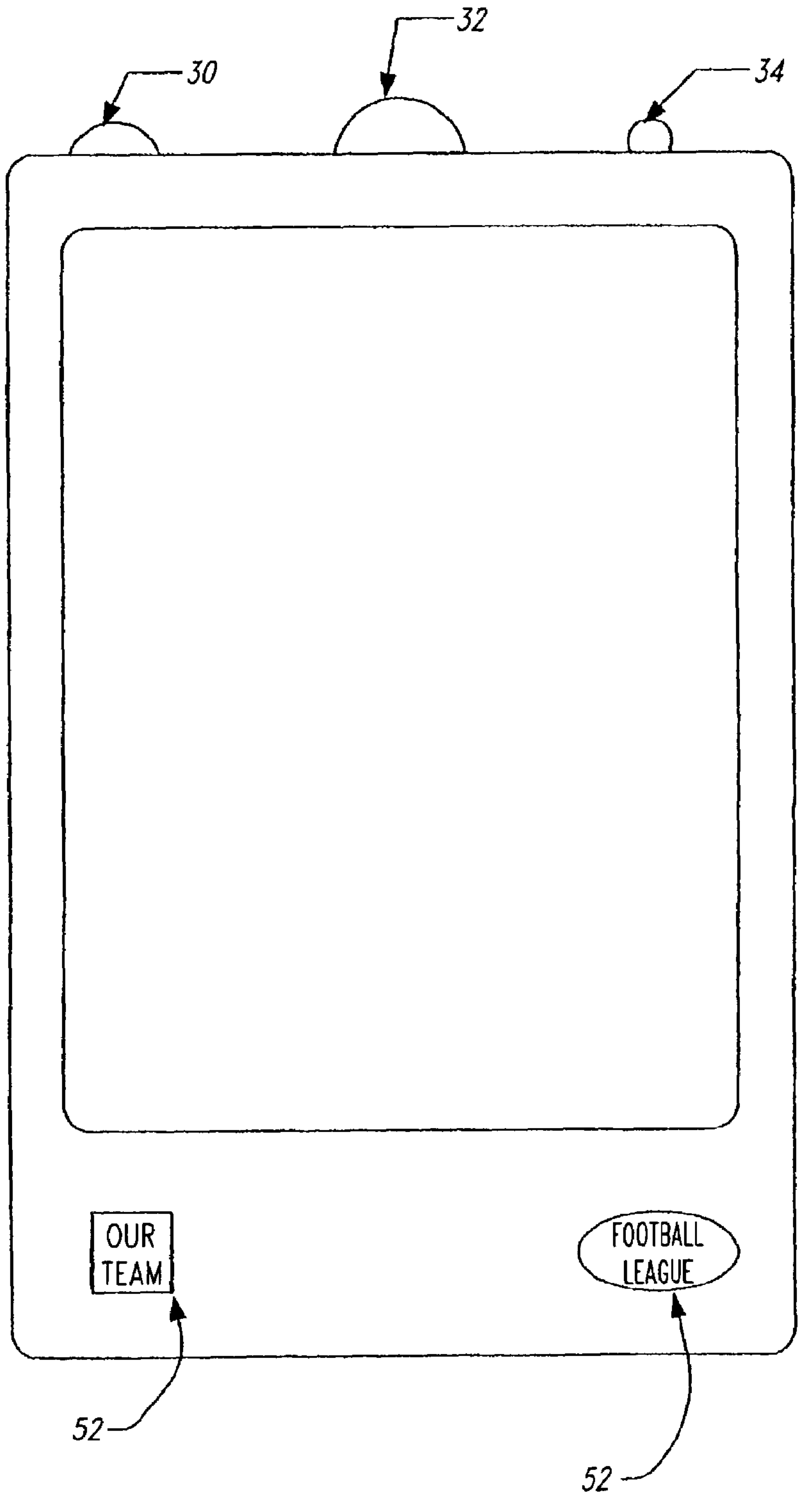

As shown in FIG. 4, in one embodiment, the outer housing 33 of the personal receiver 28 is constructed from a molded plastic shell, which will allow for a plurality of advertisement sections 52, for example, a logo stamp of an affiliated sports organizations or paid advertisements. This may be on the back, as shown in FIG. 4, or on the front or side.

Figure 5:
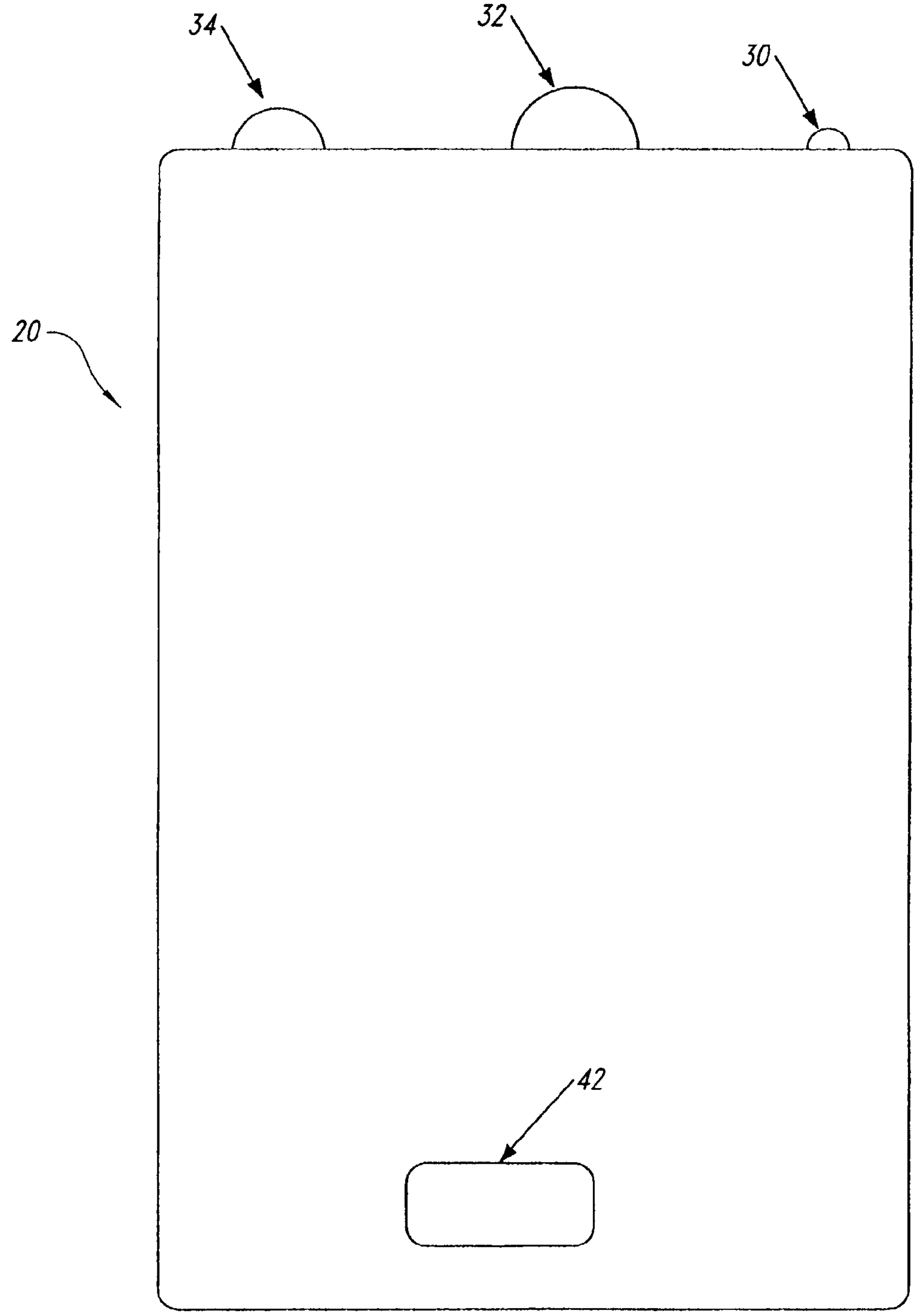

FIG. 5 shows a receptor 42 which may be provided on a back side of the receiver 28. The receptor 42 may mate with any appropriate electrical connector to provide instructions, data, or power to receiver 28. It may be used for programming the microchip, establishing certain settings, charging a battery within the housing 33, or performing other electrical functions.

Figure 6:
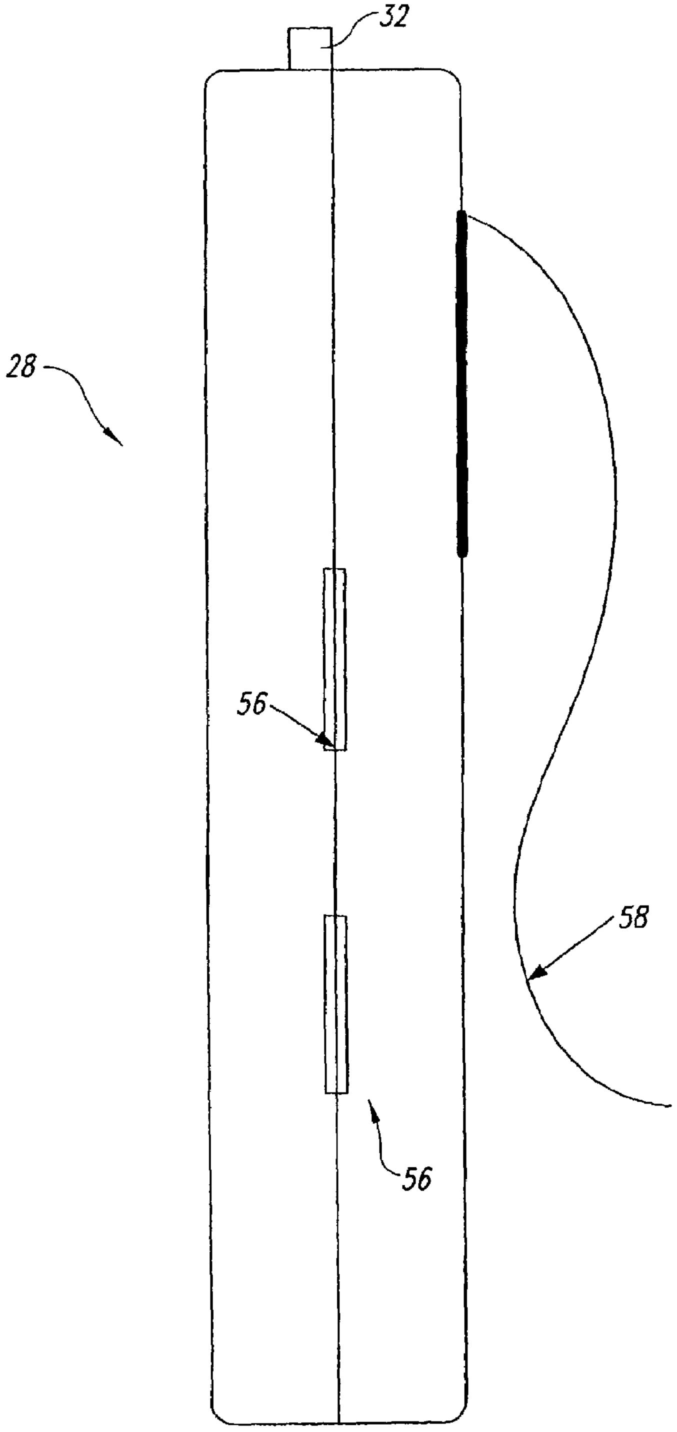

FIG. 6 depicts an attachment clip 58 for the personal receiver 28. Preferably, the personal receiver 28 will include a clip 58 on the back panel that will allow the user to easily clip it to a shirt pocket or other convenient location. Standoffs or clips 56 may optionally be provided on the side in some embodiments.

Figure 7:
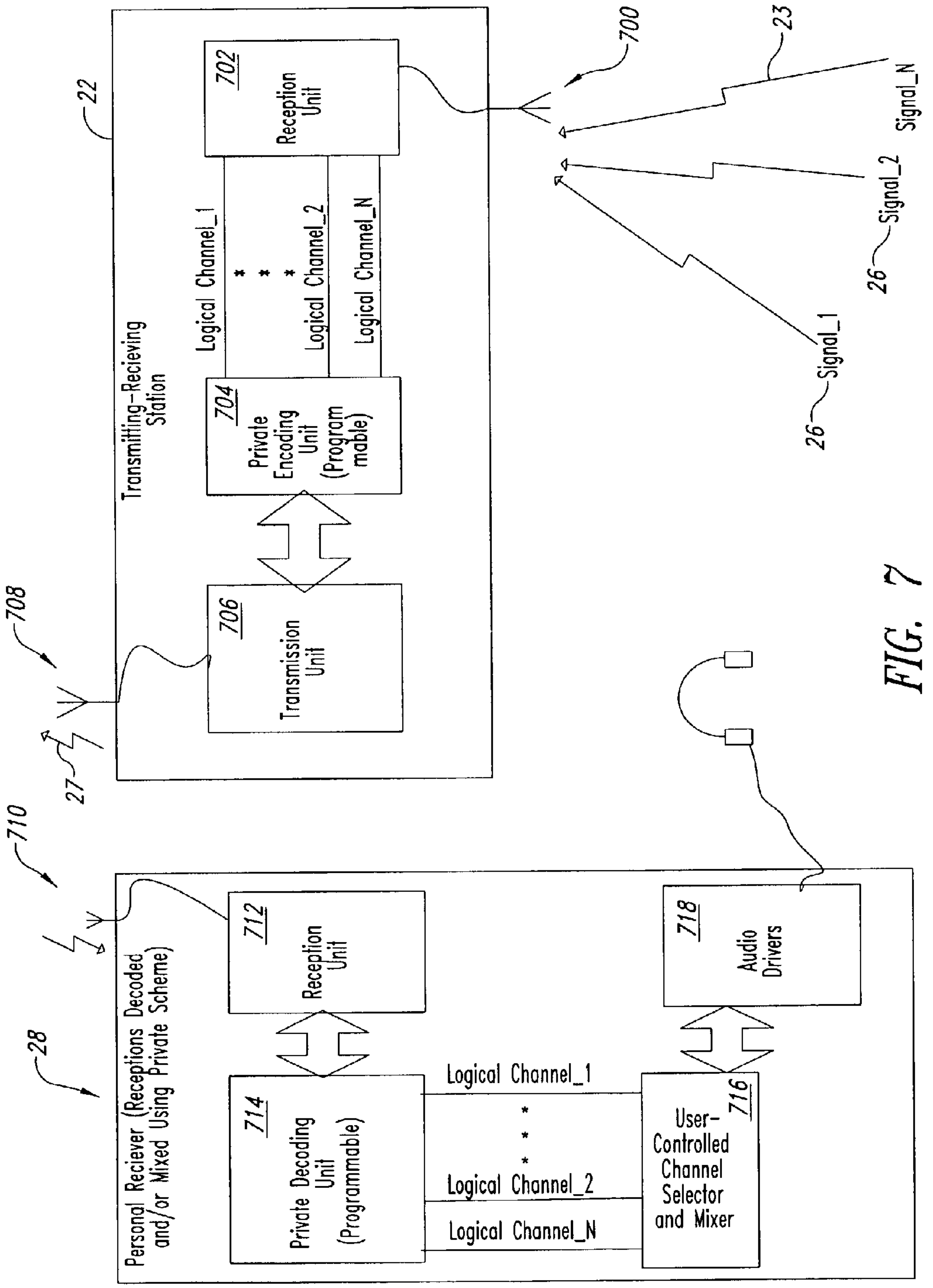
FIG. 7 depicts a more detailed block diagram representation of various components and processes previously depicted and described in relation to FIGS. 1–6.

FIG. 7 depicts a more detailed block diagram representation of various components and processes previously depicted and described in relation to FIGS. 1–6. Illustrated is receiving-transmitting station 22 receiving wireless signals 1 through N via receiving-transmitting station 22's receiving antenna 700, where wireless signals 1 through N are representative of wireless signals transmitted by pickups 26, or broadcast signals transmitted by broadcast stations such as broadcast station 102. Reception unit 702 converts the received wireless signals 1 through N to representative logical channels 1 through N and thereafter transmits the representative logical channels 1 through N to private encoding unit 704. Private encoding unit 704 encodes the logical channels 1 through N and thereafter transmits the encoded logical channels to transmission unit 706.

Transmission unit 706 thereafter multiplexes the encoded logical channels 1 through N and transmits a multiplexed signal carrying encoded logical channels 1 through N via receiving-transmitting station 22's transmitting antenna 708. Transmission unit 706 can use any of a number of conventional multiplexing techniques such as frequency division multiplexing (FDMA), time division multiplexing (TDMA), code division multiplexing (CDMA), or wideband code division multiplexing (WCDMA), etc. In addition, in embodiments which use code division multiplexing, or other spectrum spreading techniques, private encoding unit 704 may not be necessary in that the spectrum spreading techniques themselves may be sufficient to serve as the private encoding utilized by aspects of the present invention.

Personal receiver 28 receives the wireless signal transmitted by receiving-transmitting station 22 via personal receiver 28's receiving antenna 710. (Although devices are shown herein with separate receiving and transmitting antennas, for the sake of illustration and ease of understanding, those having ordinary skill in the art will appreciate that in most instances the transmitting and receiving antennas are the same antenna.) Receiving unit 712 demultiplexes the received multiplexed signal transmitted by receiving-transmitting station 22 and thereafter transmits the demultiplexed encoded logical channels 1 through N to private encoding unit 714. Private encoding unit 714 decodes the encoded logical channels 1 through N and thereafter transmits the decoded logical channels 1 through N to user-controlled channel selector and mixer unit 716. Thereafter, user controlled channel and selector mixer unit 716 transmits the one or more selected and mixed channels to audio drivers 718, which power earphones 44.

Both private encoding unit 704 and private decoding unit 714 are shown as being programmable. In one embodiment, private encoding unit 704 is manually programmed by the system operator with one of a plurality of available encoding algorithms. In one embodiment, private decoding unit 714 is manually programmed by the user of the personal receiver 28, via an input device (such as a pushbutton), to utilize the companion decoding algorithm in use by private encoding unit 704. In one embodiment this is achieved via the system operator instructing the user of personal receiver 28 as to the decoding algorithm in use by private encoding unit 704. This can be done by wireless instructions or connection to receptor 42.

In another embodiment, private encoding unit 704 is programmed to use a specific encoding algorithm, and personal receiver 28 programs private decoding unit 714 to utilize the companion decoding algorithm via a handshaking operation which will now be described.

Figure 8:
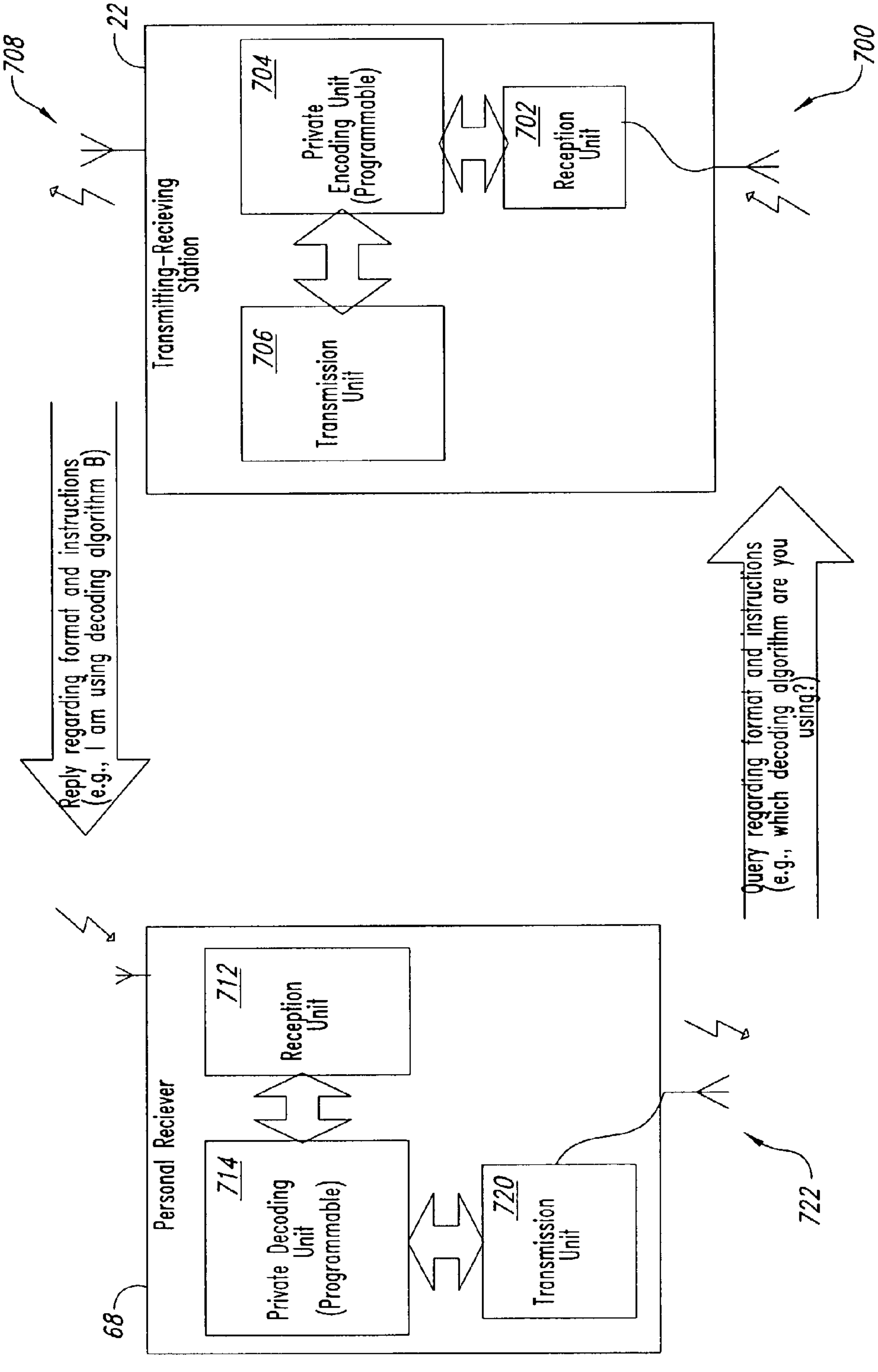
FIG. 8 depicts a more detailed block diagram representation of various components and processes previously depicted and described in relation to FIGS. 1–6, wherein a handshaking operation is described.

FIG. 8 depicts a more detailed block diagram representation of various components and processes previously depicted and described in relation to FIGS. 1–6, wherein a handshaking operation is described. Private decoding unit 714 of personal receiver 28 transmits a query via transmission unit 720 and personal receiver 28's transmitting antenna 722. The query requests format and instructions from private encoding unit 702. In one embodiment, the query specifically requests that private encoding unit 702 inform private decoding unit 714 of the encoding algorithm in use by private encoding unit 704.

Private encoding unit 704 receives the query from private decoding unit 714 via reception unit 702 and receiving-transmitting station 22's receiving antenna 700. In response to the received query, private encoding unit 704 of transmitting-receiving station 22 transmits a response to the query via transmission unit 706 and receiving-transmitting station 22's transmitting antenna 708. The response to this query contains format and instructions from private encoding unit 704. In one embodiment, the format and instructions specifically indicate the encoding algorithm in use by private encoding unit 704 (e.g., "using encoding algorithm B").

In one embodiment, upon receipt of the format and instructions, private decoding unit 714 programs itself to use the companion decoding algorithm to that encoding algorithm in use by private encoding unit 704. An example of the foregoing will now be described.

Figure 9:
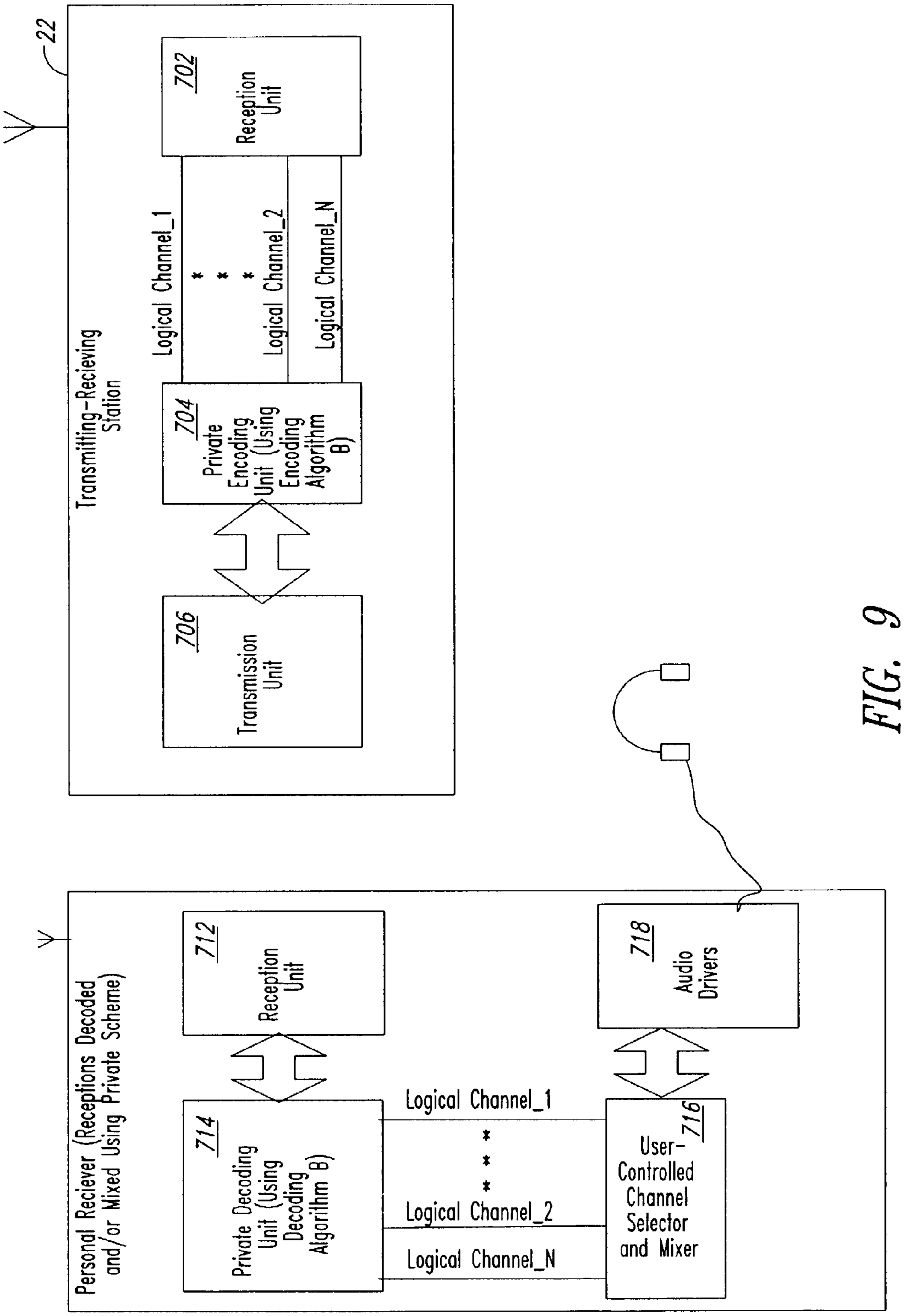
FIG. 9 depicts a more detailed block diagram representation of various components and processes previously depicted and described in relation to FIGS. 1–6, wherein private decoding unit 714 has programmed itself to use the companion decoding algorithm to that encoding algorithm in use by private encoding unit 702.

FIG. 9 depicts a more detailed block diagram representation of various components and processes previously depicted and described in relation to FIGS. 1–6, wherein private decoding unit 714 has programmed itself to use the companion decoding algorithm to that encoding algorithm in use by private encoding unit 702. Specifically, shown is that private encoding unit 704 is utilizing encoding algorithm B. Depicted is that, in response to a previously executed handshaking operation such as that depicted and described in relation to FIG. 8, private decoding unit 714 has programmed itself to use decoding algorithm B, which is the companion to encoding algorithm B in use by private encoding unit 704. In addition to the foregoing, FIG. 9 is also representative of the previously described operation where private encoding unit 704 is programmed by the system user to use encoding algorithm B, and private decoding unit 714 has been manually programmed by the user of personal receiver 28 such that private decoding unit 714 utilizes decoding algorithm B.

Figure 10:
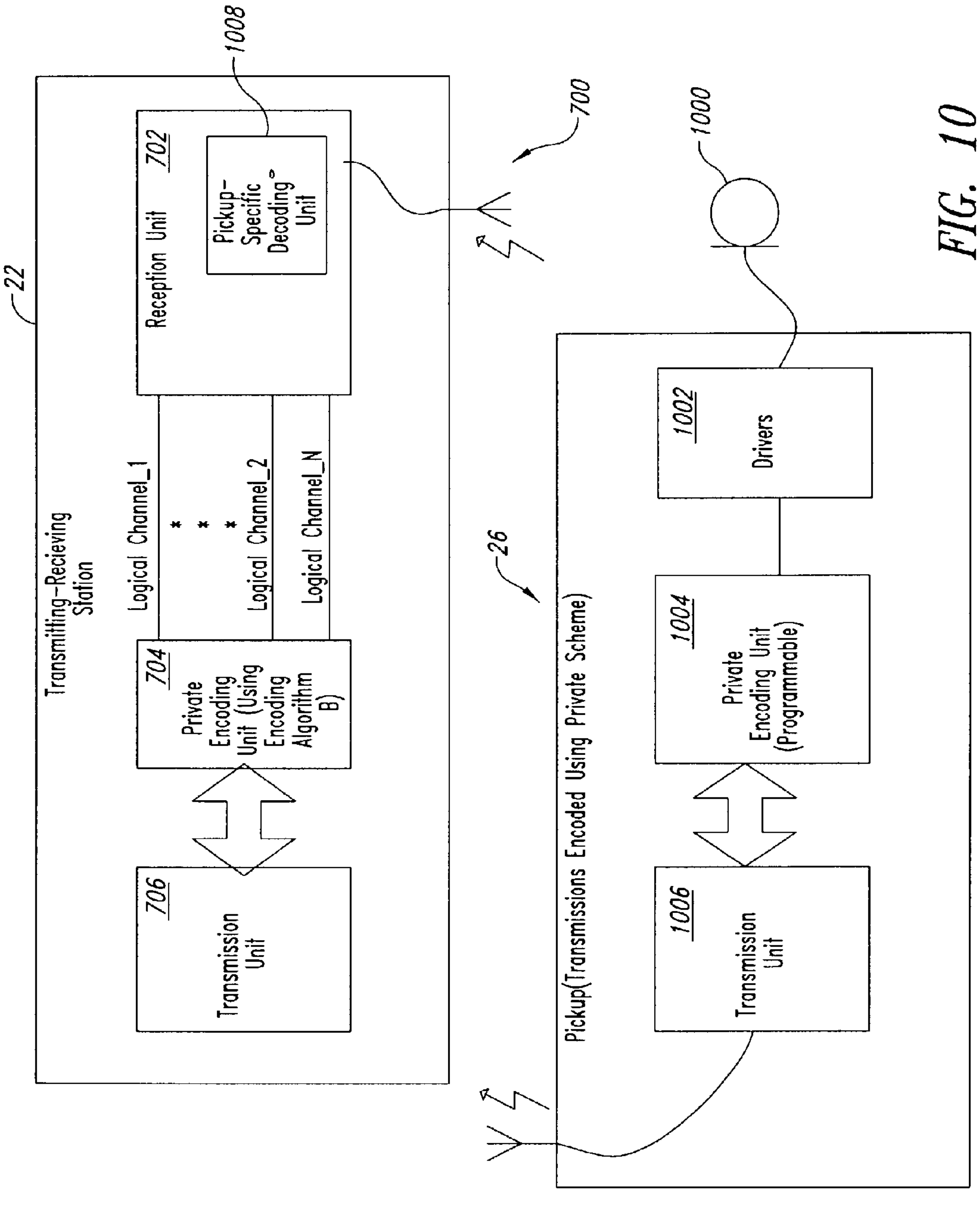
FIG. 10 depicts a more detailed block diagram representation of various components and processes previously depicted and described in relation to FIGS. 1–6.

FIG. 10 depicts a more detailed block diagram representation of various components and processes previously depicted and described in relation to FIGS. 1–6. Specifically, shown is pickup 26 having microphone 1000. Signals picked up by microphone 1000 are received by drivers 1002. Drivers 1002 drive private encoding unit 1004 (shown as a programmable encoding unit). Private encoding unit 1004 transmits the encoded signal to transmission unit 1006. Transmission unit 1006 transmits a wireless signal, carrying the encoded signal, via a transmitting antenna of pickup 26. A wire or cable connection may also be used for the transmission of the signal from the pickup.

Reception unit 702 of receiving-transmitting unit 22 receives the encoded signal via receiving-transmitting unit 22's receiving antenna 700. Pickup-specific decoding unit 1008 (shown as a programmable decoding unit) receives and decodes the encoded wireless signal. Thereafter, reception unit 702 functions as has been described previously.

In one embodiment, private encoding unit 1004 programs itself to use the companion algorithm to the decoding algorithm in use by pickup-specific decoding unit 1008 of reception unit 702, via a handshaking operation analogous to the described in relation to FIGS. 8–9. In another embodiment, both private encoding unit 1004 and pickup-specific decoding unit 1008 of reception unit 702 are manually programmed by the system operator.

Although only one pickup 26 paired with one pickup specific decoding unit 1008 have been shown, those having ordinary skill in the art will appreciate that in most embodiments reception unit 702 will have a unique pickup-specific decoding unit 1008 for each unique pickup 26 in use.

Figure 11:
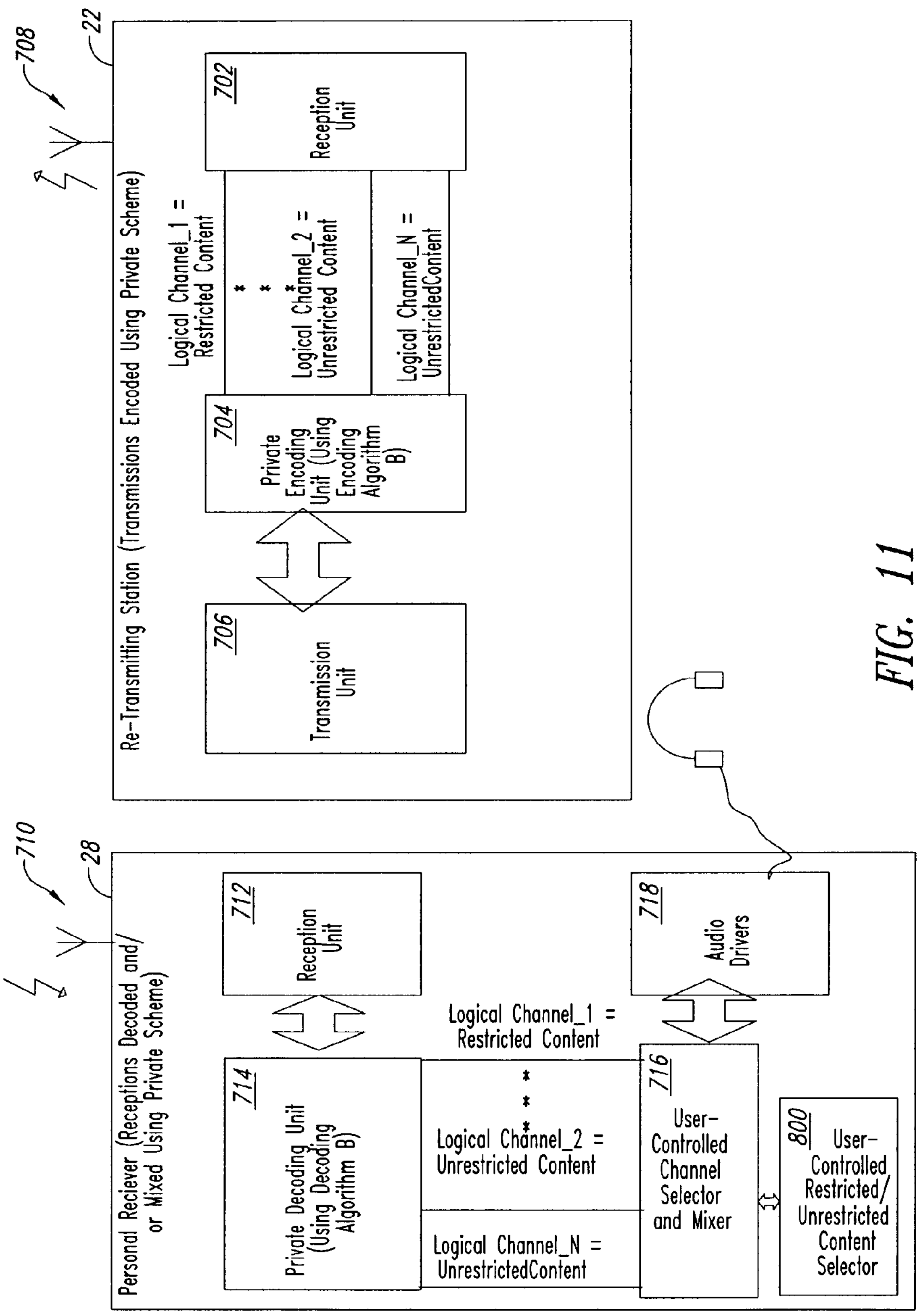
FIG. 11 depicts a more detailed block diagram representation of various components and processes previously depicted and described in relation to FIGS. 1–6, which has features in common with previously described FIG. 7.

FIG. 11 depicts a more detailed block diagram representation of various components and processes previously depicted and described in relation to FIGS. 1–6, which has features in common with previously described FIG. 7. With respect to the features of FIG. 11 in common with FIG. 7, the operation of such common features will not be re-described here in that the operation of such features in FIG. 11 are analogous to the operation of such features as depicted and described in relation to FIG. 7. However, in addition to the features in common with FIG. 7, illustrated is that logical channel_1 carries restricted content, logical channel_2 carries unrestricted content, and logical channel_N carries unrestricted content. As used herein, examples of "restricted" content would be content captured by pickups 26 which are located where profanity is likely to be heard, such as pickups 26 located in the dugout or bullpen of baseball field 100, or located on a manager or a catcher during a baseball game. Another example of restricted content would be direct feed of delayed broadcasts, such as signals which feed those network television channels which are typically delayed 7 seconds for purposes of censorship by the network. As used herein, examples of "unrestricted" content would be content wherein profanity is not likely to be heard, such as content obtained from broadcast station 102.

In addition to the previously described components, personal receiver 28 further contains user controlled restricted/unrestricted content selector 800. In one embodiment, user controlled restricted/unrestricted content selector 800, in response to user input, ensures that those logical channels carrying restricted content are not delivered to audio drivers 718. Consequently, user controlled restricted/unrestricted content selector 800 provides parents with the opportunity to ensure that their children are not exposed to the off-colored comments or profanity in use by players, coaches, and managers at professional sport events. In one embodiment, the logical channel carries "tags" which user controlled restricted/unrestricted content selector can recognize as indicative of either restricted or unrestricted content and screen accordingly. In another embodiment, the user is provided with a list of channels, such as on a paper card, which the user, or a user's parent or the operator can then use to manually screen selected channels by number. For example, a parent programming a child's personal receiver 28 such that the child's personal receiver 28 would screen out logical channel_1 due to the content of logical channel_1. In one embodiment, such selection is by a simple manual selector, while in another embodiment such selection is done via a pushbutton labeled screen restricted content, while in yet another embodiment a parent's personal receiver 28 in proximity to a child's personal receiver 28 effects the restriction by radio control of the child's personal receiver 28 via conventional radio control techniques.

Figure 12:
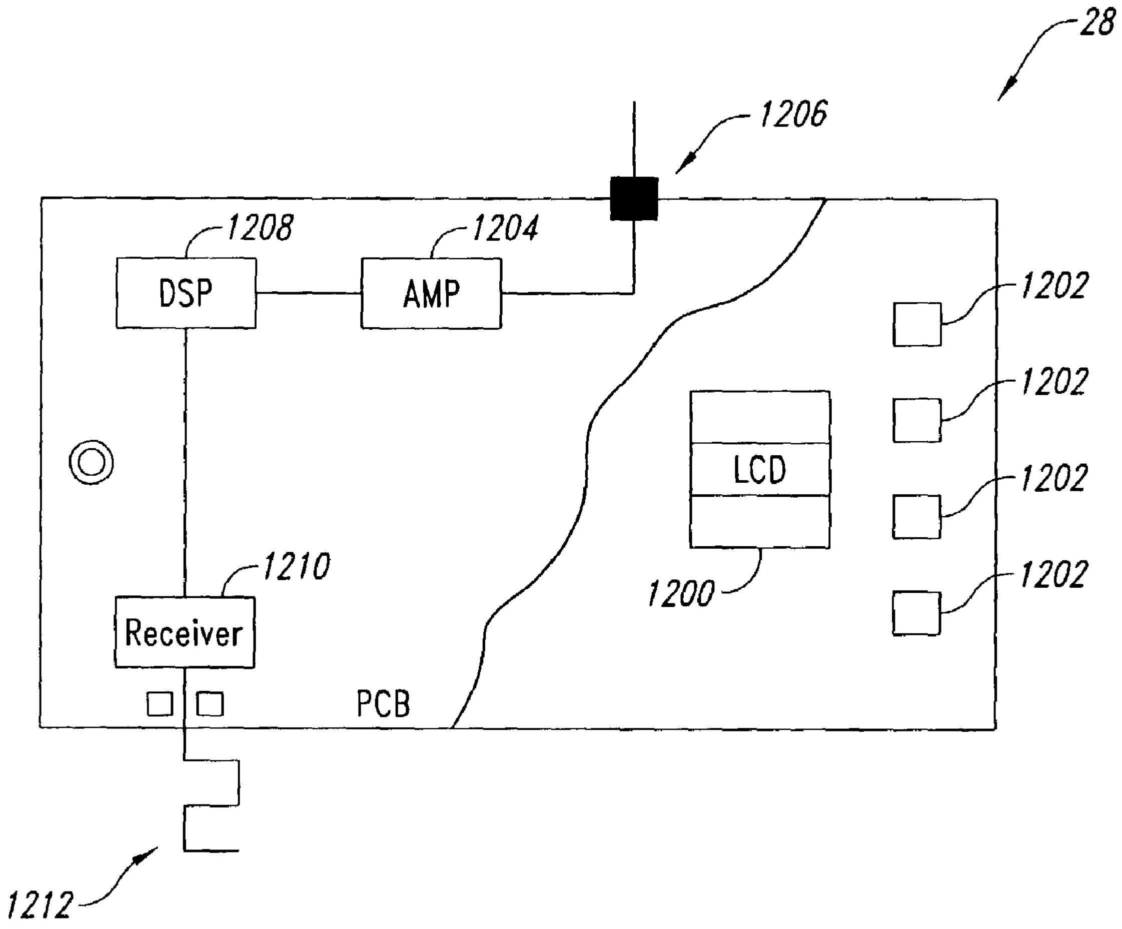
FIG. 12 depicts a cutaway view of a further possible physical implementation of personal receiver 28.

Each of these channels can be selected by the user turning the channel selector 34 to the appropriate channel corresponding to the broadcast the user wishes to hear, see for example FIG. 2, or pushing the desired buttons as shown in FIG. 12, described below.

FIG. 12 depicts a cutaway view of a further possible physical implementation of personal receiver 28. Personal receiver 28 has, on its exterior, LCD screen 1200, which in one embodiment displays alphanumeric characters (e.g., channels selected, mixed, screened, etc.). Personal receiver 28 has buttons 1202, which in one embodiment can be used to select, mix, or screen various channels in the fashion described herein. Depicted in cutaway is that amplifier 1204 drives earphone adapter 1206, which can be used to drive any one of a number of earphones. Amplifier 1204 is driven by (Digital Signal Processor) DSP 1208, which is programmed to provide any one or more of the selecting, mixing, and content-based screening functions as described previously. DSP 1208 receives input from receiver 1210. Receiver 1210 receives a signal (such as that sent by receiving/transmitting station 22) from antenna 1212.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety, as are any applications or other documents which such documents themselves incorporated by reference.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

The foregoing described embodiments depict different components contained within, or connected with, different other components. It is to be understood that such depicted architectures are merely exemplary, and that many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the scope of this invention. Furthermore, it is to be understood that the invention is solely defined by the appended claims. It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

What is claimed is:

1. A system comprising:

two or more pickups respectively associated with two or more positional locations relative to an event, the two or more pickups respectively transmitting two or more distinct signals;

a transmitting-receiving station receiving the two or more distinct signals and having two or more channels respectively associated with the two or more distinct signals, the transmitting-receiving station encoding the two or more channels and transmitting a multiplexed signal carrying the encoded two or more channels; and a personal communications device receiving the multiplexed signal and decoding the encoded two or more channels, the personal communications device having a channel selector configurable to select from the two or more decoded channels; and a programmable decoding unit communicating with an encoding unit associated with the transmitting-receiving station, the personal communications device configurable to transmit a query to the transmitting-receiving station requesting information associated with the encoding unit.

2. The system of claim 1, wherein said transmitting-receiving station comprises:

a programmable encoding unit.

3. The system of claim 1, wherein the two or more positional locations relative to an event comprises:

at least two positional locations selected from a positional-location group including a baseball field dugout position, a baseball bullpen position, a broadcast booth position, a batting cage position, a base bag position, a manager position, a coach position, an umpire position, a field position, a game-related commentary position, a television camera position, a locker room position, a baseball player position, a fan-area position, a race car driver position, a racing announcer position, and a foreign translator position.

4. The system of claim 1, further comprising:

said transmitting-receiving station having two or more channels respectively carrying a broadcast selected from a broadcast-group including an audio broadcast, a television broadcast, and a foreign language broadcast.

5. The system of claim 1, further comprising:

said transmitting-receiving station having two or more channels configured to intermittently carry at least one of an advertising message, an emergency broadcast message, and a traffic report message.

6. The system of claim 1, further comprising:

said transmitting-receiving station having two or more channels configured to intermittently carry a message directed to a particular personal communications device.

7. The system of claim 1, wherein the personal communications device comprises:

the personal communications device configurable to mix at least a portion of the two or more decoded channels.

8. The system of claim 1, wherein the personal communications device comprises:

the personal communications device configurable to restrict access to at least a portion of the two or more decoded channels.

9. A system comprising:

a plurality of audio pickup devices respectively located at a plurality of positions relative to an event;

a transmitting-receiving station which receives a plurality of signals from said plurality of audio pickup devices respectively located at the plurality of positions relative to the event, and transmits encoded versions of the plurality of signals;

a plurality of personal receiving devices, each of the plurality of personal receiving devices receiving and decoding the encoded versions of the plurality of signals; and each personal receiver having a channel selector to select at least one channel, wherein the at least one channel corresponds to one of the plurality of signals from said plurality of audio pickup devices respectively located at the plurality of positions relative to the event, each personal receiver having a transmitter to transmit a query to the transmitting-receiving station requesting information associated with an encoding algorithm.

10. The system of claim 9, further comprising each personal receiver having a channel mixer to mix at least one channel with at least one other channel, wherein the at least one channel corresponds to one of the plurality of signals from said plurality of audio pickup devices respectively located at the plurality of positions relative to the event.

11. The system of claim 9, further comprising each personal receiver having a content-based channel selector to select at least one channel, wherein the at least one channel has restriction-based content.

12. The system of claim 1, wherein the two or more pickups each comprise:

a programmable encoding unit.

13. The system of claim 12, wherein the transmitting-receiving station comprises:

a programmable decoding unit.

* * * * *